(12) United States Patent
Wang et al.

(10) Patent No.: US 12,644,450 B2
(45) Date of Patent: Jun. 2, 2026

(54) SERVICE LIFE TEST APPARATUS FOR PRODUCTION OF DIAPHRAGM OF DIAPHRAGM COMPRESSOR

(71) Applicant: Zhongding Hengsheng Gas Equipment (Wuhu) Co., Ltd., Wuhu City (CN)

(72) Inventors: Juntuan Wang, Wuhu City (CN); Fei Wang, Wuhu City (CN); Li Ren, Wuhu City (CN); Yunlong Pan, Wuhu City (CN)

(73) Assignee: ZHONGDING HENGSHENG GAS EQUIPMENT (WUHU) CO., LTD., Wuhu City (CN)

( * ) Notice: Subject to any disclaimer, the term of this patent is extended or adjusted under 35 U.S.C. 154(b) by 274 days.

(21) Appl. No.: 18/646,017

(22) Filed: Apr. 25, 2024

(65) Prior Publication Data

US 2024/0360825 A1     Oct. 31, 2024

(30) Foreign Application Priority Data

Apr. 25, 2023   (CN) .......................... 202310455467.4

(51) Int. Cl.
*F04B 51/00*          (2006.01)
*F04B 43/02*          (2006.01)
          (Continued)

(52) U.S. Cl.
CPC .............. *F04B 51/00* (2013.01); *F04B 43/02* (2013.01); *F04B 45/04* (2013.01); *G01M 13/00* (2013.01)

(58) Field of Classification Search
CPC .......... F04B 51/00; F04B 43/02; F04B 45/04; F04B 43/00–14; F04B 45/00–10;
          (Continued)

(56) References Cited

U.S. PATENT DOCUMENTS 10,845,272 B2 * 11/2020 Grabau .............. G05B 23/0283

FOREIGN PATENT DOCUMENTS

CN          104049628 A      9/2014
CN          113153712 A      7/2021
          (Continued)

*Primary Examiner* — Judy Nguyen
*Assistant Examiner* — James Split
(74) *Attorney, Agent, or Firm* — MUNCY, GEISSLER, OLDS & LOWE, P.C.

(57)                ABSTRACT

Disclosed is a service life test apparatus for production of a diaphragm of a diaphragm compressor. The apparatus includes a bottom frame, a test diaphragm head, an oil pressure boosting assembly, a gas pressure boosting assembly and a driving assembly. The test diaphragm head is installed on the bottom frame and is configured to fix the diaphragm. A support frame is installed on the bottom frame. The oil pressure boosting assembly and the gas pressure boosting assembly are installed at positions of two sides of the support frame. Through the arrangement of the test diaphragm head, the pressure boosting assemblies and the driving assembly, a test load may be exerted onto the diaphragm by using gas pressure and oil pressure, and an actual work environment, the received load magnitude and the load distribution condition of the diaphragm may be simulated, so that test results may be more accurate.

4 Claims, 7 Drawing Sheets

(51) Int. Cl.
    *F04B 45/04*         (2006.01)
    *G01M 13/00*        (2019.01)

(58) Field of Classification Search
    CPC ....... G01M 13/003; G01M 99/00–008; G01M
                                    13/00–005
    See application file for complete search history.

(56)                    References Cited

FOREIGN PATENT DOCUMENTS

| CN | 115406781 A | | 11/2022 | |
|----|-------------|---|---------|--------------|
| KR | 20110008818 A | * | 1/2011 | .............. G01N 3/12 |
| SU | 1183854 A1 | | 10/1985 | |

\* cited by examiner

SERVICE LIFE TEST APPARATUS FOR PRODUCTION OF DIAPHRAGM OF DIAPHRAGM COMPRESSOR

TECHNICAL FIELD

The disclosure relates to the technical field of diaphragm test, and in particular, to a service life test apparatus for production of a diaphragm of a diaphragm compressor.

BACKGROUND

A diaphragm compressor is a reciprocating compressor realizing gas compression and delivery through reciprocating motion of a metallic diaphragm in a gas cylinder. A metallic diaphragm is one of key components of the diaphragm compressor. The service life of the diaphragm compressor may be directly influenced by the quality of the metallic diaphragm. Therefore, the metallic diaphragm requires a service life test before mass production.

Existing diaphragm service life tests generally adopt the following two manners: 1. Installing the diaphragm onto the diaphragm compressor for test. By adopting this manner, an accurate test result may be obtained, but the integral machine operation power consumption of the diaphragm compressor is great, the test cost is high, and the test cycle is long. 2. Fixing the diaphragm onto a vibration bench, vibration is exerted onto the diaphragm by a driving structure on the vibration bench to realize the test on the service life of the diaphragm. By using this manner, a load exertion position is generally a middle or edge position of the diaphragm, but a load in the actual working process of the diaphragm is formed by hydraulic pressure and air pressure together, the surface stress of the diaphragm in the diaphragm deformation process accordingly changes, and the stress condition of the diaphragm in the actual working process cannot be accurately simulated by using the vibration bench to test the diaphragm, so that the test result of this test manner has poor accuracy.

Therefore, a service life test apparatus for production of the diaphragm of the diaphragm compressor is needed for solving the above problems.

SUMMARY

An objective of the disclosure is to provide a service life test apparatus for production of a diaphragm of a diaphragm compressor to solve the problems in the prior art mentioned in the Background.

To achieve the above objective, the disclosure provides the following technical solution:

A service life test apparatus for production of a diaphragm of a diaphragm compressor includes a bottom frame, a test diaphragm head, an oil pressure boosting assembly, a gas pressure boosting assembly and a driving assembly. The test diaphragm head is installed on the bottom frame and is configured to fix the diaphragm. A support frame is installed on the bottom frame. The oil pressure boosting assembly and the gas pressure boosting assembly are fixedly installed at positions of two sides of the support frame, and the oil pressure boosting assembly and the gas pressure boosting assembly are configured to supply a pressure into the test diaphragm head. The driving assembly configured to drive the oil pressure boosting assembly and the gas pressure boosting assembly to boost the pressure is installed on the support frame. A cooling assembly configured to cool the test diaphragm head is installed on the bottom frame, and the cooling assembly is driven by gas exhausted from the test diaphragm head.

Preferably, the test diaphragm head includes a lower cover body, an upper cover body and a cooling cavity. The lower cover body is installed on the bottom frame, and the upper cover body is installed on an upper end of the lower cover body. An inwards recessed cavity is formed in a covering position of the upper cover body and the lower cover body, and medium inlet and outlet holes communicating with the inwards recessed cavity are formed in each of the upper cover body and the lower cover body. The diaphragm is disposed between the upper cover body and the lower cover body. The cooling cavity is formed in the upper cover body.

Preferably, each of the oil pressure boosting assembly and the gas pressure boosting assembly includes a pressure boosting cylinder, a piston and a telescopic post. The pressure boosting cylinders are installed at positions of two sides of the support frame. Each of the pistons is glidingly connected into the corresponding pressure boosting cylinder in a sealed manner. Each of the telescopic posts is glidingly connected into the corresponding pressure boosting cylinder. One end of each of the telescopic posts is connected with the corresponding piston, and the other end of each of the telescopic posts is connected with a driving plate. Two connecting holes are respectively formed in each of two side end surfaces of each of the pressure boosting cylinders.

One connecting hole of the oil pressure boosting assembly is connected with the medium inlet hole of the lower cover body through a pipeline, and a second one-way throttle valve is connected onto the pipeline. The other connecting hole is connected with the medium outlet hole of the lower cover body through a pipeline, and a second one-way valve is connected onto the pipeline.

Preferably, the driving assembly includes a driving disc, a driving post and a driving motor. The driving disc is rotationally connected onto the support frame, and the driving disc is positioned between the oil pressure boosting assembly and the gas pressure boosting assembly. The driving post is connected to an eccentric position of the driving disc. The driving motor configured to drive the driving disc to rotate is installed on the support frame.

Preferably, the cooling assembly includes a cooling water tank, an installing seat and a pneumatic motor. The cooling water tank is installed on the bottom frame. The installing seat is connected onto the cooling water tank. A water conveying assembly is installed on the installing seat, and the pneumatic motor configured to drive the water conveying assembly to rotate is installed on the installing seat.

One connecting hole of the gas pressure boosting assembly is connected with the medium outlet hole of the upper cover body through a pipeline, and a first one-way valve is connected onto the pipeline. The other connecting hole of the gas pressure boosting assembly is connected with a gas inlet port of the pneumatic motor through a pipeline, a gas outlet port of the pneumatic motor is connected with the medium inlet hole of the upper cover body through a pipeline, and a first one-way throttle valve is connected onto the pipeline.

Preferably, the water conveying assembly includes a shell, a water conveying hose and an extrusion frame. The shell is connected onto the installing seat. The water conveying hose is disposed in the shell. The extrusion frame is rotationally connected into the shell and is configured to extrude the water conveying hose. A rotating shaft of the extrusion frame is connected with an output shaft of the pneumatic motor.

One end of the water conveying hose communicates with one end of the cooling cavity, and the other end of the water conveying hose extends to an inner bottom of the cooling water tank. The other end of the cooling cavity communicates with the cooling water tank.

Preferably, a pressure gauge configured to monitor an internal pressure is connected onto each of the lower cover body and the upper cover body.

Compared with the prior art, the disclosure has the following beneficial effects:

1. According to the disclosure, through the arrangement of the test diaphragm head, the pressure boosting assemblies and the driving assembly, the test loads may be exerted onto the diaphragm by using gas pressure and oil pressure, and the actual working environment, the received load magnitude and the load distribution condition of the diaphragm may be simulated, so that the test results may be more accurate. In addition, through the cooperation of the pressure boosting assemblies and the driving assembly, twice load exertion may be realized in a process of once reciprocating motion of the diaphragm, so that the test efficiency of the service life of the diaphragm may be improved, and the test cycle is shortened.

2. According to the disclosure, the pneumatic motor is driven by the backflow gas pressure in the test process, so that the pneumatic motor drives the water conveying assembly to circulate the cooling water in the cooling cavity and the cooling water tank for realizing the cooling of the diaphragm, the diaphragm may be in a normal working temperature environment, so as to ensure the accuracy of the test results. At the same time, the cooling assembly has a simple structure and low installation cost. Additionally, the cooling water is circularly driven by using the backflow gas pressure, the gas flowing heating quantity is reduced, the energy utilization rate is improved, and the power consumption of the test apparatus is reduced.

3. According to the disclosure, the test load magnitude is adjusted by adjusting the first one-way throttle valve and the second one-way throttle valve. By using such a manner, when one side of the diaphragm receives a pressure, the other side receives the backflow resistance of the air or hydraulic oil at the same time. Compared with a test manner of only exerting a pressure in a single direction, this manner has the advantages that test results are more accurate, and loads at different magnitudes may be exerted to two side surfaces of the diaphragm, and the service life of the diaphragm of the diaphragm compressor under various working conditions may be tested, so that the applicability of the service life test apparatus is improved.

4

Figure 1:
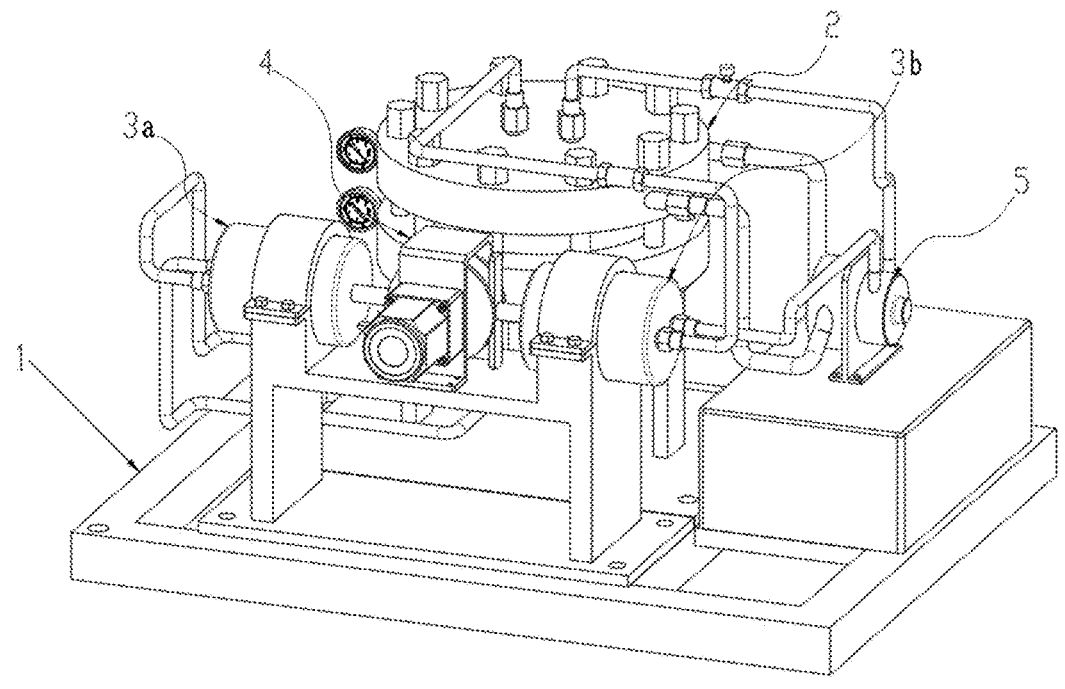
FIG. 1 and FIG. 2 are schematic diagrams of an integral structure of the disclosure in different perspectives.
Figure 2:
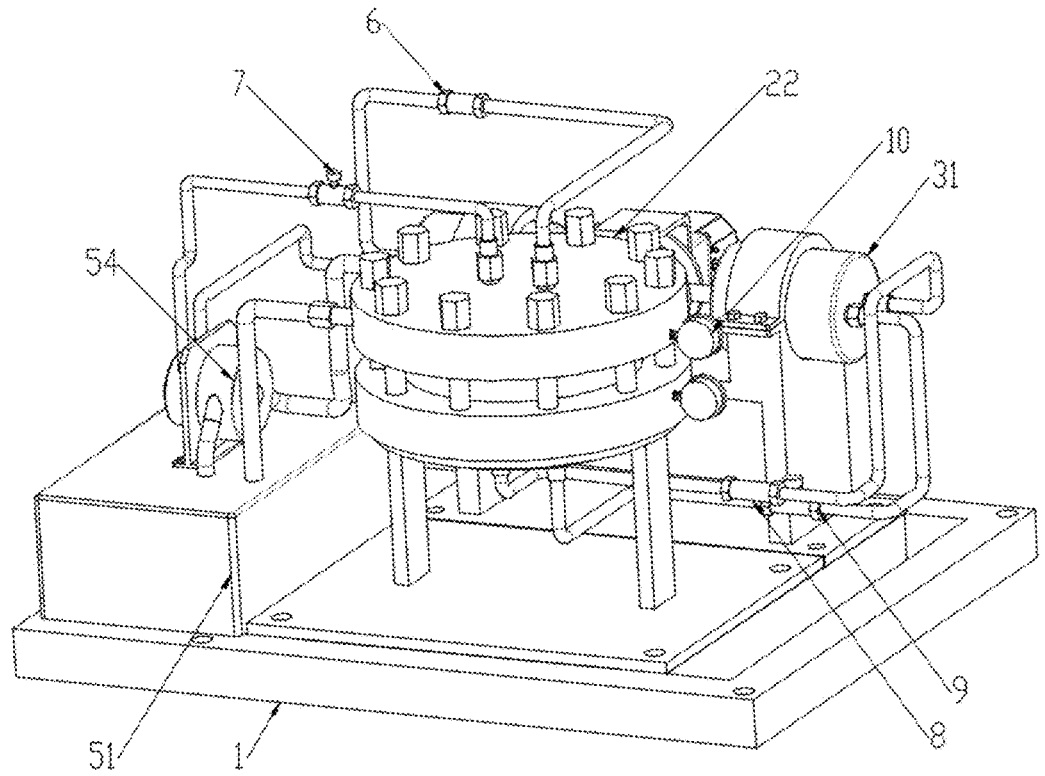
Figure 3:
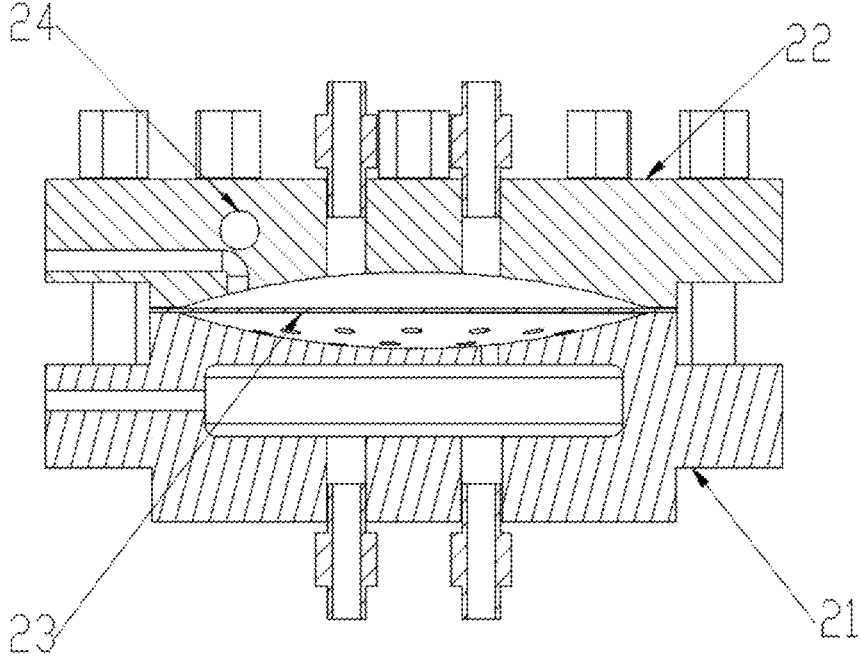
FIG. 3 is a schematic diagram of a sectional structure of a test diaphragm head of the disclosure.
Figure 4:
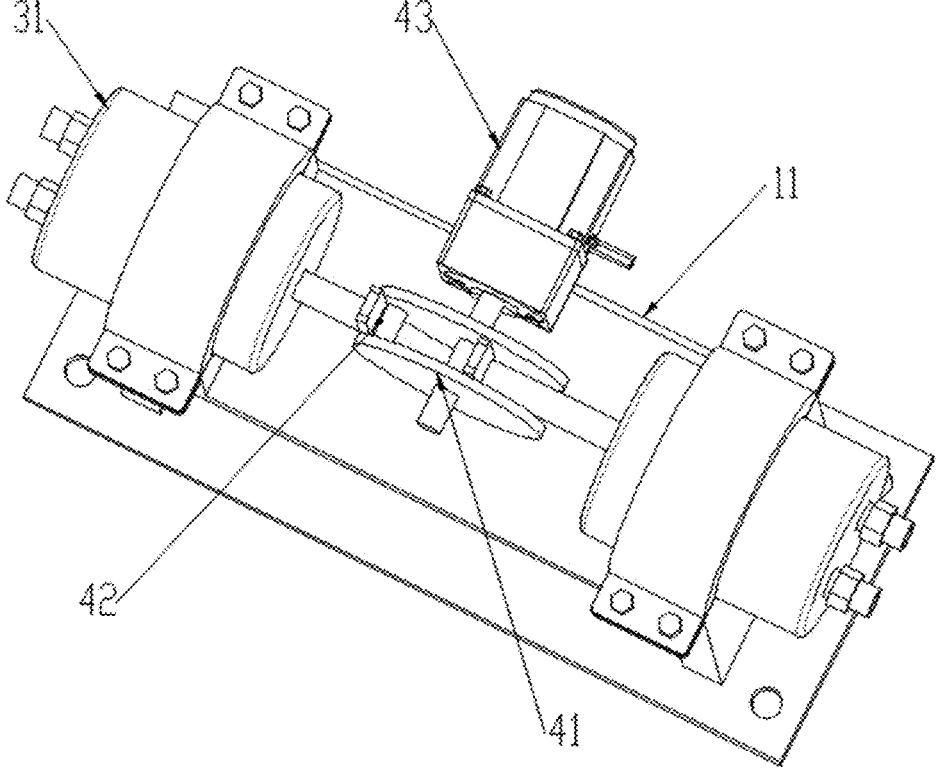
FIG. 4 is a schematic structure diagram of a driving assembly and pressure boosting assemblies of the disclosure.
Figure 5:
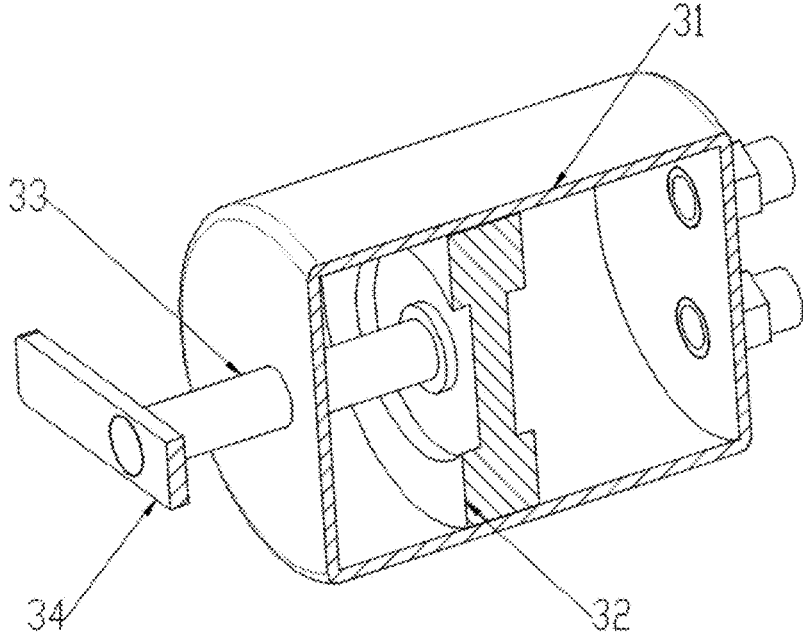
FIG. 5 is a schematic diagram of a sectional structure of pressure boosting assemblies of the disclosure.
Figure 6:
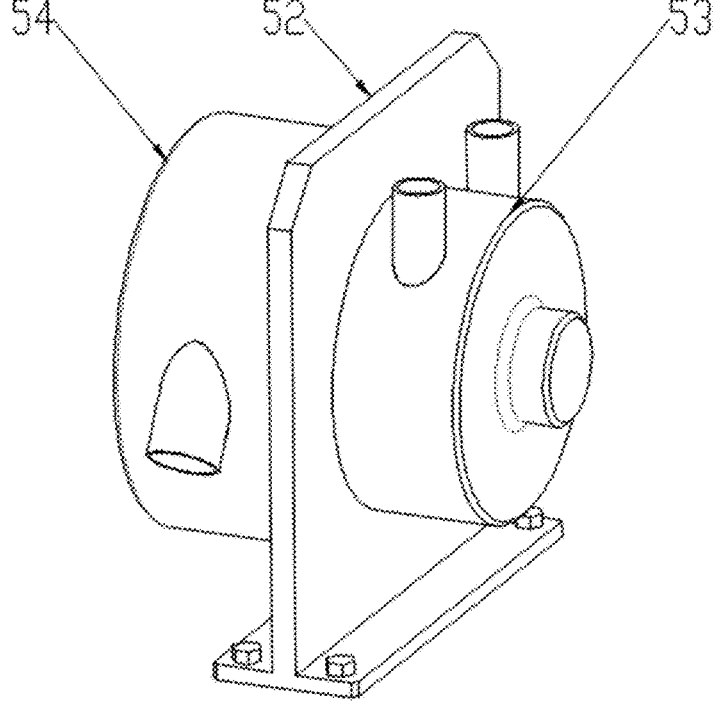
FIG. 6 is a schematic structure diagram of a cooling assembly of the disclosure.
Figure 7:
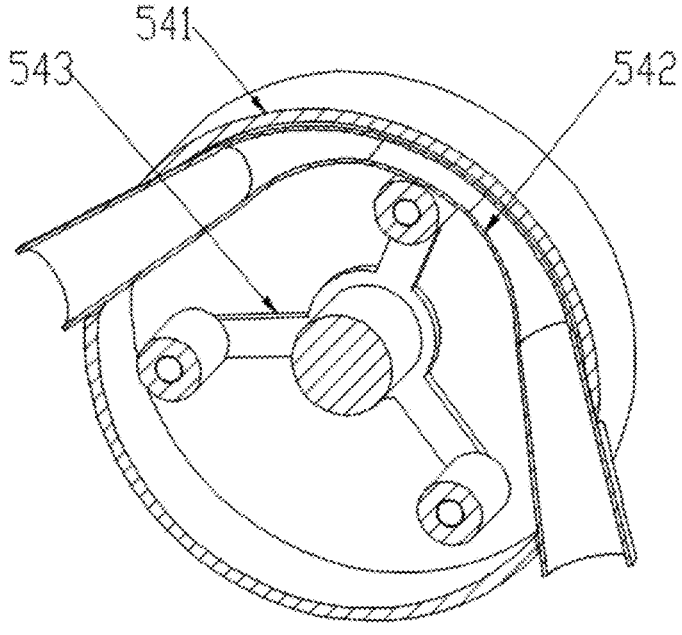

FIG. 7 is a schematic diagram of a sectional structure of a water conveying assembly of the disclosure.

In the figures, 1 denotes bottom frame, 11 denotes support frame, 2 denotes test diaphragm head, 21 denotes lower cover body, 22 denotes upper cover body, 23 denotes diaphragm, 24 denotes cooling cavity, 3a denotes oil pressure boosting assembly, 3b denotes gas pressure boosting assembly, 31 denotes pressure boosting cylinder, 32 denotes piston, 33 denotes telescopic post, 34 denotes driving plate, 4 denotes driving assembly, 41 denotes driving disc, 42 denotes driving post, 43 denotes driving motor, 5 denotes cooling assembly, 51 denotes cooling water tank, 52 denotes installing seat, 53 denotes pneumatic motor, 54 denotes water conveying assembly, 541 denotes shell, 542 denotes water conveying hose, 543 denotes extrusion frame, 6 denotes first one-way valve, 7 denotes first one-way throttle valve, 8 denotes second one-way valve, 9 denotes second one-way throttle valve, and 10 denotes pressure gauge.

DETAILED DESCRIPTION

For the purpose of making technical measures, creative features, objectives and efficiency implemented by the disclosure clearer to understand, the disclosure will be further illustrated in combination with specific implantations below.

Referring to FIG. 1 to FIG. 7, the disclosure provides a technical solution:

A service life test apparatus for production of a diaphragm of a diaphragm compressor includes a bottom frame 1, a test diaphragm head 2, an oil pressure boosting assembly 3a, a gas pressure boosting assembly 3b and a driving assembly 4. The test diaphragm head 2 is installed on the bottom frame 1 and is configured to fix the diaphragm 23. The test diaphragm head 2 includes a lower cover body 21, an upper cover body 22 and a cooling cavity 24. The lower cover body 21 is installed on the bottom frame 1, and the upper cover body 22 is installed on an upper end of the lower cover body 21. An inwards recessed cavity is formed in a covering position of the upper cover body 22 and the lower cover body 21, and medium inlet and outlet holes communicating with the inwards recessed cavity are formed in each of the upper cover body 22 and the lower cover body 21. The diaphragm 23 is disposed between the upper cover body 22 and the lower cover body 21. The cooling cavity 24 is formed in the upper cover body 22. An actual work environment of the diaphragm 23 may be simulated through the arrangement of the test diaphragm head 2, so that test results may be realer and more reliable.

A support frame 11 is installed on the bottom frame 1. The oil pressure boosting assembly 3a and the gas pressure boosting assembly 3b are installed at positions of two sides of the support frame 11, and the oil pressure boosting assembly 3a and the gas pressure boosting assembly 3b are configured to supply a pressure into the test diaphragm head 2. Each of the oil pressure boosting assembly 3a and the gas pressure boosting assembly 3b includes a pressure boosting cylinder 31, a piston 32 and a telescopic post 33. The pressure boosting cylinders 31 are installed at positions of two sides of the support frame 11. Each of the pistons 32 is glidingly connected into the corresponding pressure boosting cylinder 31 in a sealed manner. Each of the telescopic posts 33 is glidingly connected into the corresponding pressure boosting cylinder 31. One end of each of the telescopic posts 33 is connected with the corresponding piston 32, and the other end of each of the telescopic posts 33 is connected with a driving plate 34. Two connecting holes are respectively formed in each of two side end surfaces of each of the pressure boosting cylinders 31. One connecting hole of the oil pressure boosting assembly 3a is connected with the medium inlet hole of the lower cover body 21 through a pipeline, and a second one-way throttle valve 9 is connected onto the pipeline. The other connecting hole is connected with the medium outlet hole of the lower cover body 21 through a pipeline, and a second one-way valve 8 is connected onto the pipeline. Through the arrangement of the oil pressure boosting assembly 3a and the gas pressure boosting assembly 3b, loads may be exerted onto two sides of the diaphragm 23. A medium in the gas pressure boosting assembly 3b is air, and a medium in the oil pressure boosting assembly 3a is hydraulic oil. The service lives of the diaphragm 23 under the working conditions of receiving an air pressure and a hydraulic pressure are tested. In a working process of a whole machine of the diaphragm compressor, the diaphragm 23 may only receive a great pressure load in an exhaust state. Through the arrangement of the oil pressure boosting assembly 3a and the gas pressure bosting assembly 3b, twice load exertion may be realized in a process of once reciprocating motion of the diaphragm 23, and the test efficiency of the service life of the diaphragm may be improved. Furthermore, the gas pressure and hydraulic pressure during test may be controlled by adjusting the first one-way throttle valve 7 and the second one-way throttle valve 9, so that the service life of the diaphragm 23 under different load conditions may be conveniently tested.

The driving assembly 4 configured to drive the oil pressure boosting assembly 3a and the gas pressure boosting assembly 3b to boost the pressure is further installed on the support frame 11. The driving assembly 4 includes a driving disc 41, a driving post 42 and a driving motor 43. The driving disc 41 is rotationally connected onto the support frame 11, and the driving disc 41 is positioned between the oil pressure boosting assembly 3a and the gas pressure boosting assembly 3b. The driving post 42 is connected to an eccentric position of the driving disc 41. The driving motor 43 configured to drive the driving disc 41 to rotate is installed on the support frame 11. The driving assembly 4 may continuously switch and drive the oil pressure boosting assembly 3a and the gas pressure boosting assembly 3b, so that the diaphragm 23 does reciprocating motion.

A cooling assembly 5 configured to cool the test diaphragm head 2 is further installed on the bottom frame 1, and the cooling assembly 5 is driven by gas exhausted from the test diaphragm head 2. The cooling assembly 5 includes a cooling water tank 51, an installing seat 52 and a pneumatic motor 53. The cooling water tank 51 is installed on the bottom frame 1. The installing seat 52 is connected onto the cooling water tank 51. A water conveying assembly 54 is installed on the installing seat 52, and the pneumatic motor 53 configured to drive the water conveying assembly 54 to rotate is installed on the installing seat 52. In a working process of the diaphragm compressor, the diaphragm 23 may generate heat, so that the diaphragm compressor is provided with a heat dissipation device; and the cooling assembly 5 may cool the test diaphragm head 2 and the diaphragm 23 to ensure that the diaphragm 23 in the test process is at the working state temperature, and the test results may be more accurate.

Heat may be generated in the test diaphragm head 2 in the actual working process of the diaphragm compressor, and too high working temperature may cause service life reduction of the diaphragm of the diaphragm compressor and gas compression efficiency reduction. Therefore, the diaphragm compressor may be provided with an external refrigeration unit and an external heat exchanger to realize heat dissipation on the diaphragm compressor, conveying pipelines and a gas storage tank to ensure good compression and storage of gas. However, the external refrigeration unit and the external heat exchanger have huge sizes, high power consumption and high installation cost. When the diaphragm 23 is tested, only the heat dissipation on the test diaphragm head 2 is needed, the required heat dissipation quantity is small, and the applicability of the external refrigeration unit and the external heat exchanger to the service life test process of the diaphragm 23 is poor.

The water conveying assembly 54 includes a shell 541, a water conveying hose 542 and an extrusion frame 543. The shell 541 is connected onto the installing seat 52. The water conveying hose 542 is disposed in the shell 541. The extrusion frame 543 is rotationally connected into the shell 541 and is configured to extrude the water conveying hose 542. A rotating shaft of the extrusion frame 543 is connected with an output shaft of the pneumatic motor 53. One end of the water conveying hose 542 communicates with one end of the cooling cavity 24, and the other end of the water conveying hose 542 extends to an inner bottom of the cooling water tank 51. The other end of the cooling cavity 24 communicates with the cooling water tank 51. The water conveying assembly 54 enables cooling water to circulate in the cooling cavity 24 and the cooling water tank 51 under the driving by the pneumatic motor 53.

One connecting hole of the gas pressure boosting assembly 3b is connected with the medium outlet hole of the upper cover body 22 through a pipeline, and a first one-way valve 6 is connected onto the pipeline. The other connecting hole of the gas pressure boosting assembly 3b is connected with a gas inlet port of the pneumatic motor 53 through a pipeline, a gas outlet port of the pneumatic motor 53 is connected with the medium inlet hole of the upper cover body 22 through a pipeline, and a first one-way throttle valve 7 is connected onto the pipeline. The cooling assembly 5 in the apparatus is driven by gas pressure generated in the test process, the energy utilization rate is improved, and the power consumption of the test apparatus is reduced.

A pressure gauge 10 configured to monitor an internal pressure is connected onto each of the lower cover body 21 and the upper cover body 22. The pressure gauge 10 may display the pressure in the test cavity at each of two sides of the diaphragm 23 in real time, and may assist in the adjustment by the first one-way throttle valve 7 and the second one-way throttle valve 9. In case of fatigue damage of the diaphragm 23, the pressure in the test cavities at two sides of the diaphragm 23 cannot reach a set value, and the pressure gauge 10 may indicate whether the diaphragm 23 generates fatigue damage or not.

The disclosure has the following working process:

When a service life test on a diaphragm of a diaphragm compressor is needed, firstly, the diaphragm 23 is installed to a position between the lower cover body 21 and the upper cover body 22, and the driving motor 43 is started to drive the driving disc 41 to rotate. When the driving post 42 on the driving disc 41 drives the oil pressure boosting assembly 3a, the driving post 42 pushes the driving plate 34, so that the telescopic post 33 slides towards the inside of the pressure boosting cylinder 31. The telescopic post 33 drives the piston 32 to slide in the pressure boosting cylinder 31, the piston 32 extrudes out the hydraulic oil in the pressure boosting cylinder 31 through the medium outlet hole, and the hydraulic oil enters the cavity of the lower cover body 21 through the second one-way valve 8, so that the hydraulic oil exerts a test load on a lower surface of the diaphragm 23.

The diaphragm 23 receives a pressure to generate motion and compresses air in the cavity of the upper cover body 22, so that the air enters the pneumatic motor 53 through the first one-way throttle valve 7, and enters the gas pressure boosting assembly 3b through the pneumatic motor 53, so that the piston 32 in the pressure boosting cylinder 31 does reset sliding in a direction towards the driving disc 41, and a test of once load exertion on the diaphragm 23 is realized.

When the driving post 42 on the driving disc 41 drives the gas pressure boosting assembly 3b, the air in the pressure boosting cylinder 31 enters the cavity of the upper cover body 22 through the first one-way valve 6 to exert a test load on the diaphragm 23, and the hydraulic oil in the lower cover body 21 flows back to the oil pressure boosting assembly 3a through the second one-way throttle valve 9 to realize a secondary load exertion test on the diaphragm 23. In such a way, the diaphragm 23 does reciprocating motion, and the test on the service life of the diaphragm may be realized. In the load exertion process, when the maximum pressure value of the pressure gauge 10 cannot reach a set value, it can be determined that the diaphragm 23 is in a fatigue damage state, the test may be stopped, and a test result may be obtained.

The pneumatic motor 53 rotates under the effect of the test gas pressure, so that the pneumatic motor drives the extrusion frame 543 to rotate. The water conveying hose 542 is alternately extruded and released through a roller post on the extrusion frame 543, a negative pressure is formed in the water conveying hose 542, cooling water accordingly flows, and this process is similar to a process of extruding a hose fully filled with liquid by two fingers, so that the circulation of the cooling water in the cooling cavity 24 and the cooling water tank 51 is realized, which enables the diaphragm 23 to be at a normal working temperature, and the test accuracy is improved.

Although embodiments of the disclosure have been shown and descried, those of ordinary skill in the art may make various variations, modifications, replacements and conversions on these embodiments without deviating from the principles and spirits of the disclosure, and the scope of the disclosure is defined by the attached claims and their equivalents.

What is claimed is:

1. A service life test apparatus for production of a diaphragm of a diaphragm compressor, comprising a bottom frame (1), a test diaphragm head (2), an oil pressure boosting assembly (3a), a gas pressure boosting assembly (3b) and a driving assembly (4), wherein the test diaphragm head (2) is installed on the bottom frame (1) and is configured to fix the diaphragm (23), a support frame (11) is installed on the bottom frame (1), the oil pressure boosting assembly (3a) and the gas pressure boosting assembly (3b) are fixedly installed at positions of two sides of the support frame (11), the oil pressure boosting assembly (3a) and the gas pressure boosting assembly (3b) are configured to supply a pressure into the test diaphragm head (2), the driving assembly (4) configured to drive the oil pressure boosting assembly (3a) and the gas pressure boosting assembly (3b) to boost the pressure is installed on the support frame (11), a cooling assembly (5) configured to cool the test diaphragm head (2) is installed on the bottom frame (1), and the cooling assembly (5) is driven by gas exhausted from the test diaphragm head (2);

the test diaphragm head (2) comprises a lower cover body (21), an upper cover body (22) and a cooling cavity (24), the lower cover body (21) is installed on the bottom frame (1), the upper cover body (22) is installed on an upper end of the lower cover body (21), an inwards recessed cavity is formed in a covering position of the upper cover body (22) and the lower cover body (21), medium inlet and outlet holes communicating with the inwards recessed cavity are formed in each of the upper cover body (22) and the lower cover body (21), the diaphragm (23) is disposed between the upper cover body (22) and the lower cover body (21), and the cooling cavity (24) is formed in the upper cover body (22);

each of the oil pressure boosting assembly (3a) and the gas pressure boosting assembly (3b) comprises a pressure boosting cylinder (31), a piston (32) and a telescopic post (33), the pressure boosting cylinders (31) are installed at positions of two sides of the support frame (11), each of the pistons (32) is glidingly connected into the corresponding pressure boosting cylinder (31) in a sealed manner, each of the telescopic posts (33) is glidingly connected into the corresponding pressure boosting cylinder (31), one end of each of the telescopic posts (33) is connected with the corresponding piston (32), the other end of each of the telescopic posts (33) is connected with a driving plate (34), and two connecting holes are respectively formed in each of two side end surfaces of each of the pressure boosting cylinders (31); one connecting hole of the oil pressure boosting assembly (3a) is connected with the medium inlet hole of the lower cover body (21) through a pipeline, a second one-way throttle valve (9) is connected onto the pipeline, the other connecting hole is connected with the medium outlet hole of the lower cover body (21) through a pipeline, and a second one-way valve (8) is connected onto the pipeline; and the driving assembly (4) comprises a driving disc (41), a driving post (42) and a driving motor (43), the driving disc (41) is rotationally connected onto the support frame (11), the driving disc (41) is positioned between the oil pressure boosting assembly (3a) and the gas pressure boosting assembly (3b), the driving post (42) is connected to an eccentric position of the driving disc (41), and the driving motor (43) configured to drive the driving disc (41) to rotate is installed on the support frame (11).

2. The service life test apparatus for production of a diaphragm of a diaphragm compressor according to claim 1, wherein the cooling assembly (5) comprises a cooling water tank (51), an installing seat (52) and a pneumatic motor (53), the cooling water tank (51) is installed on the bottom frame (1), the installing seat (52) is connected onto the cooling water tank (51), a water conveying assembly (54) is installed on the installing seat (52), and the pneumatic motor (53) configured to drive the water conveying assembly (54) to rotate is installed on the installing seat (52); and one connecting hole of the gas pressure boosting assembly (3b) is connected with the medium outlet hole of the upper cover body (22) through a pipeline, a first one-way valve (6) is connected onto the pipeline, the other connecting hole of the gas pressure boosting assembly (3b) is connected with a gas inlet port of the pneumatic motor (53) through a pipeline, a gas outlet port of the pneumatic motor (53) is connected with the medium inlet hole of the upper cover body (22) through a pipeline, and a first one-way throttle valve (7) is connected onto the pipeline.

3. The service life test apparatus for production of a diaphragm of a diaphragm compressor according to claim 2, wherein the water conveying assembly (54) comprises a shell (541), a water conveying hose (542) and an extrusion frame (543), the shell (541) is connected onto the installing seat (52), the water conveying hose (542) is disposed in the shell (541), the extrusion frame (543) is rotationally connected into the shell (541) and is configured to extrude the water conveying hose (542), and a rotating shaft of the extrusion frame (543) is connected with an output shaft of the pneumatic motor (53); and one end of the water conveying hose (542) communicates with one end of the cooling cavity (24), the other end of the water conveying hose (542) extends to an inner bottom of the cooling water tank (51), and the other end of the cooling cavity (24) communicates with the cooling water tank (51).

4. The service life test apparatus for production of a diaphragm of a diaphragm compressor according to claim 1, wherein a pressure gauge (10) configured to monitor an internal pressure is connected onto each of the lower cover body (21) and the upper cover body (22).

\*   \*   \*   \*   \*